(12) United States Patent
Peng

(10) Patent No.: US 7,130,205 B2
(45) Date of Patent: Oct. 31, 2006

(54) IMPEDANCE SOURCE POWER CONVERTER

(75) Inventor: Fang Z. Peng, Okemos, MI (US)

(73) Assignee: Michigan State University, East Lansing, MI (US)

( * ) Notice: Subject to any disclaimer, the term of this patent is extended or adjusted under 35 U.S.C. 154(b) by 83 days.

(21) Appl. No.: 10/458,564

(22) Filed: Jun. 10, 2003

(65) Prior Publication Data

US 2003/0231518 A1    Dec. 18, 2003

Related U.S. Application Data

(60) Provisional application No. 60/388,206, filed on Jun. 12, 2002.

(51) Int. Cl.
 *H02M 7/537* (2006.01)
(52) U.S. Cl. .................. 363/140; 363/98; 363/132
(58) Field of Classification Search ............ 363/98, 363/131, 132, 140, 97; 323/259, 344
See application file for complete search history.

(56) References Cited

U.S. PATENT DOCUMENTS 4,599,685 A * 7/1986 Hombu et al. ............. 363/41
4,677,539 A * 6/1987 Erickson et al. ........... 363/132
4,864,483 A * 9/1989 Divan ........................ 363/37
5,235,504 A * 8/1993 Sood .......................... 363/53
5,499,178 A * 3/1996 Mohan ....................... 363/39
5,592,368 A * 1/1997 Bidaud et al. .............. 363/34
5,910,892 A * 6/1999 Lyons et al. ................ 363/98
5,999,419 A   12/1999 Marrero
6,191,957 B1   2/2001 Peterson
6,490,185 B1 * 12/2002 Yamanaka et al. .......... 363/98
6,829,152 B1 * 12/2004 Miura et al. ................ 363/40

* cited by examiner

*Primary Examiner*—Gary L Laxton
(74) *Attorney, Agent, or Firm*—Price, Heneveld, Cooper, DeWitt & Litton, LLP

(57) ABSTRACT

An impedance source power converter includes a power source, a main converter circuit and an impedance network. The main converter circuit is coupled to a load and the impedance network couples the power source to the main converter circuit. The impedance network is configured such that the main converter circuit is adapted to perform both buck conversion and boost conversion.

21 Claims, 8 Drawing Sheets

IMPEDANCE SOURCE POWER CONVERTER

This application claims the benefit of U.S. Provisional Patent Application Ser. No. 60/388,206, entitled "IMPEDANCE SOURCE POWER CONVERTER," which was filed Jun. 12, 2002, and which is hereby incorporated herein by reference in its entirety.

BACKGROUND OF THE INVENTION

The present invention is directed to a power converter and, more specifically, an impedance source power converter.

Power converters are utilized in various applications and have traditionally been constructed as either voltage source converters (V-converters) or current source converters (I-converters). In a typical V-converter, a DC voltage source feeds a main converter circuit, for example, a three-phase bridge. The DC voltage source may take various forms, such as a battery, a fuel cell stack, a diode rectifier and/or a capacitor. In a typical three-phase bridge, six switches are utilized to implement the main converter circuit. FIG. 1 depicts a traditional three-phase V-converter 100, which includes six switches S1–S6, which may each include a power transistor and an anti-parallel (i.e., free wheeling) diode to provide bi-directional current flow and uni-directional voltage blocking, that are fed by a DC voltage source 102. The switches S1–S6 are controlled by a control unit (e.g., a programmed microcontroller) 106 to provide a desired output.

The V-converter has a number of conceptual and theoretical limitations. For example, an AC output voltage of a V-converter is limited below and cannot exceed a voltage level of an associated DC voltage source or the level of the DC voltage source is greater than an AC input voltage. As such, the V-converter is a buck (step-down) inverter for DC-AC power conversion and the V-converter is a boost (step-up) rectifier (i.e., boost converter) for AC-DC power conversion. In applications where overdrive is desirable, an additional DC-DC boost converter is generally required to achieve a desired voltage level. However, such a DC-DC boost converter stage increases system cost and lowers system efficiency. With reference to FIG. 1, the upper and lower devices (i.e., the switch pairs S1/S2, S3/S4 and S5/S6) of each phase leg cannot be gated on simultaneously or a shoot-through occurs, which may cause the upper and lower devices to be destroyed. In the V-converter 100 of FIG. 1, shoot-through may occur when noise, e.g., electromagnetic interference (EMI), occurs. Further, an output LC filter, which also causes additional power loss and increases control complexity, is required to provide a sinusoidal voltage at the output of the V-converter 100.

FIG. 2 depicts a traditional three-phase I-converter 200, which includes a DC current source 202 that feeds a main converter circuit 204, which is a three-phase bridge. The DC current source 202 can be a relatively large DC inductor fed by a voltage source, such as a battery, fuel cell stack, diode rectifier or thyristor converter. As with the V-converter 100 of FIG. 1, six switches S7–S12 are used to implement the three-phase bridge 204. However, the switches of an I-converter are typically different than the switches of a V-converter and may include devices such as a gate turn-off thyristor (GTO), silicon controlled rectifier (SCR) or a power transistor, e.g., an insulated gate bipolar transistor (IGBT) with a series diode which provides uni-directional current flow and bi-directional voltage blocking. The switches S7–S12 are controlled by a control unit 206 to provide a desired output.

Unfortunately, an I-converter also has a number of conceptual and theoretical limitations. For example, an AC output voltage level of an I-converter has to be greater than the level of a DC voltage source that feeds a DC inductor or the DC voltage level produced is always smaller than an AC input voltage. As such, an I-converter is a boost inverter for DC-AC power conversion and a buck rectifier (or buck converter) for an AC-DC power conversion. For applications where a wide voltage range is desirable, an additional DC-DC buck (or boost) converter is generally required. The additional power converter stage increases system cost and lowers system efficiency. In a typical I-converter, at least one of the upper devices and one of the lower devices (i.e., switches S7–S12) have to be gated and maintained on at any time. Otherwise, an open circuit of the DC inductor occurs and destruction of the devices may occur. An open-circuit, as seen by the DC inductor, may occur under various conditions, such as when electromagnetic interference (EMI) inadvertently gates off a device that is required to be maintained on. Another attribute of an I-converter is that the switches of the I-converter have to block reverse voltage and thus require a series diode to be used in combination with high speed and high performance transistors, such as IGBTs. This prevents the direct use of low cost and high performance IGBT modules and intelligent power modules (IPMs).

In addition to the above-mentioned limitations, both the V-converter and the I-converter also have a number of other attributes that are less than desirable. For example, the V-converter and the I-converter are either a boost or a buck converter and cannot be both a buck and a boost converter. That is, the output voltage range obtainable from a V-converter and an I-converter are either lower or higher than an input voltage Further, the main converter circuits of the V-converter shown in FIG. 1 and the I-converter of FIG. 2 are not interchangeable.

What is needed is a power converter that is not subject to many of the limitations of traditional voltage source converters and current source converters.

SUMMARY OF THE INVENTION

The present invention is directed to an impedance source power converter that includes a power source, a main converter circuit and an impedance network. The main converter circuit is coupled to a load and the impedance network couples the power source to the main converter circuit. The impedance network is configured such that the main converter circuit can perform both buck conversion and boost conversion.

These and other features, advantages and objects of the present invention will be further understood and appreciated by those skilled in the art by reference to the following specification, claims and appended drawings.

DESCRIPTION OF THE PREFERRED EMBODIMENT(S)

According to the present invention, an impedance source power converter (Z-converter) utilizes an impedance network to couple a main converter circuit to a power source or load. Implementation of the impedance network, within the power converter, reduces or eliminates many of the negative attributes of V-converters and/or I-converters. As used herein, the term "converter" broadly includes DC-DC converters, AC-AC converters, converters performing AC-DC conversion and inverters performing DC-AC conversion.

Figure 1:
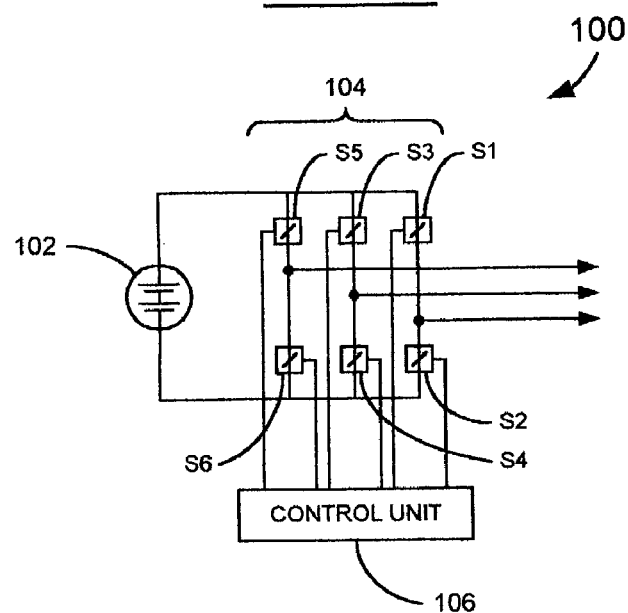
FIG. 1 is an electrical diagram of a traditional voltage source converter (V-converter)
Figure 2:
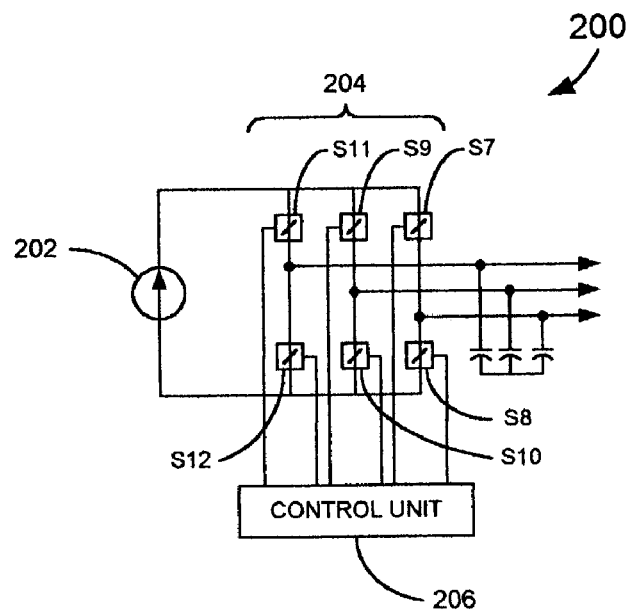
FIG. 2 is an electrical diagram of a traditional current source converter (I-converter)
Figure 3:
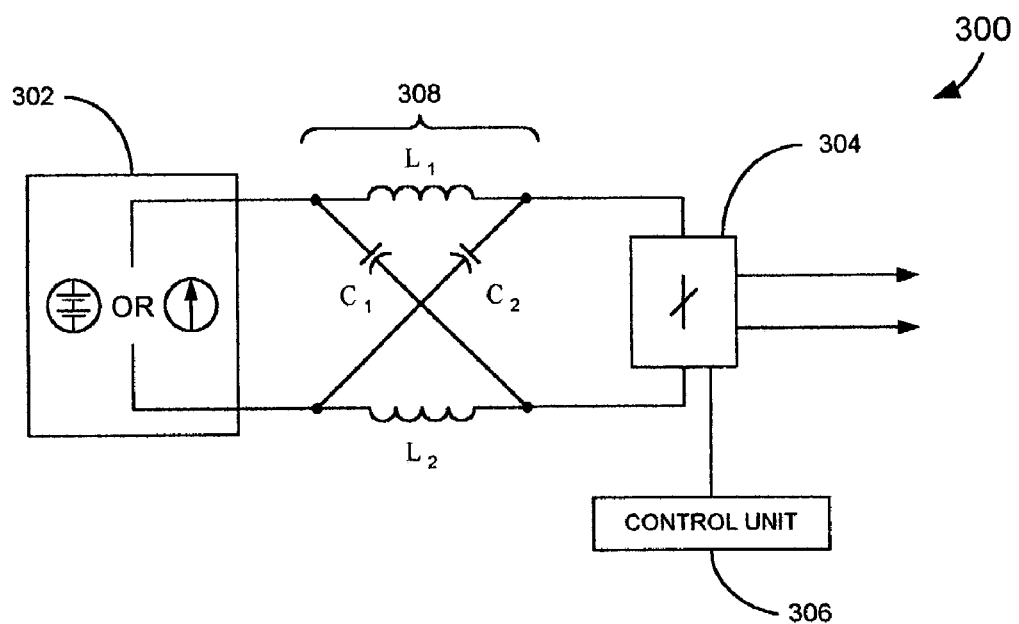
FIG. 3 is an electrical diagram of a general embodiment of an impedance source converter (Z-converter), according to an embodiment of the present invention.

FIG. 3 shows one embodiment of the present invention, which includes a two port network 308 that includes inductors L1 and L2 and capacitors C1 and C2 connected in an 'X' configuration. The 'X' configuration is employed to provide an impedance source to couple the converter (or inverter) to a DC source 302. The DC source 302 can be either a voltage source or a current source. As such, the DC source 302 can be a battery, a diode rectifier, a thyristor converter, a fuel cell stack, an inductor, a capacitor or a combination of the previously mentioned devices. Switch array 304, implemented within the main converter circuit, can be any number of different switching devices and diodes, such as AC switches, bi-directional switching devices, reverse blocking switching devices, the anti-parrallel combination used with the embodiment of FIG. 1, or the series combination used with the embodiment of FIG. 2. Further, the switch array 304 may be controlled by control unit 306 to provide single or multiple phase power (e.g., 2 phase and 3 phase power).

Figure 4:
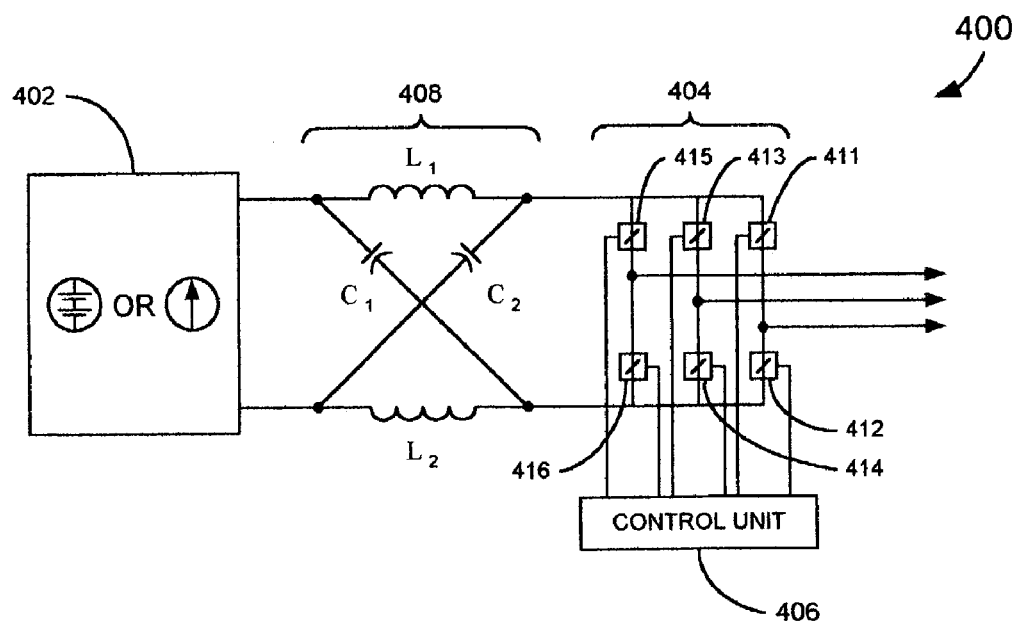
FIG. 4 is an electrical diagram of a Z-converter, which is implemented by an anti-parallel combination of switching device and diode.

FIG. 4 depicts an electrical schematic of a Z-converter 400 that utilizes the anti-parallel combination of a switching device and diode for switches 411–416, which are coupled to DC source 402 by two-port network 408 and controlled by control unit 406 to provide a desired output.

Figure 5:
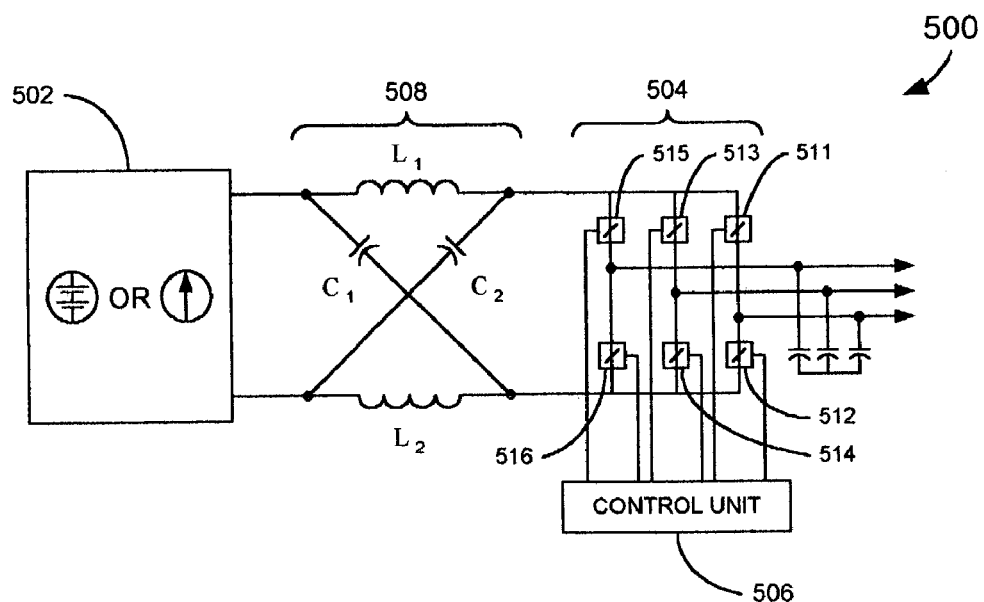
FIG. 5 is an electrical diagram of a Z-converter, which is implemented by a reverse blocking device or a series combination of switching device and diode.

FIG. 5 shows an electrical schematic of a Z-converter 500 that uses a reverse blocking device or a series combination of a switching device and a diode for switches 511–516, which are coupled to DC source 502 by two-port network 508 and controlled by control unit 506 to provide a desired output. The DC source 502 can be virtually any power source as the impedance network 508 advantageously provides an interface that couples a load to a source irrespective of the function performed.

Figure 6:
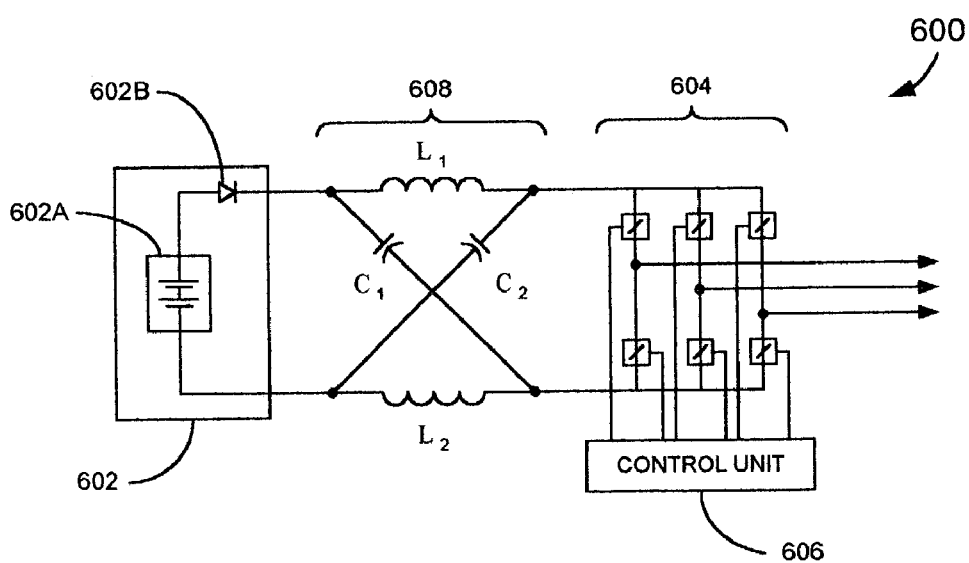
FIG. 6 is an electrical diagram of a Z-converter that functions as an inverter and whose DC voltage source is a fuel cell stack.

FIG. 6 depicts a Z-converter 600 that utilizes a fuel cell stack 602A and a diode 602B to realize DC source 602. According to the present invention, implementation of impedance circuit 608 allows the Z-converter 600, when implemented as an inverter, to provide an AC output voltage whose level can be adjusted to range both above and below the voltage level of the fuel cell stack 602A. That is, the Z-converter 600 can function as a buck/boost inverter that has a wide range of obtainable voltages. A three-phase bridge 604, as is shown in FIG. 6, has nine permissible switching states, unlike a traditional three-phase V-converter, which has eight permissible switching states. That is, a traditional three-phase V-converter has six active states (vectors), when a DC voltage is impressed across the load, and two zero states when the load terminals are shorted through the lower or upper three switching devices. However, the three-phase Z-converter bridge has one extra zero state, which occurs when the load terminals are shorted through both the upper and the lower switching devices of any one phase leg, any two phase legs, or all three phase legs. It should be appreciated that the zero state is forbidden in traditional V-converters as it would cause a shoot-through condition to occur. As utilized herein, the third zero state is referred to as a shoot-through zero state. According to the present invention, the shoot-through zero state provides a unique buck/boost feature for the Z-converter 600.

Figure 7:
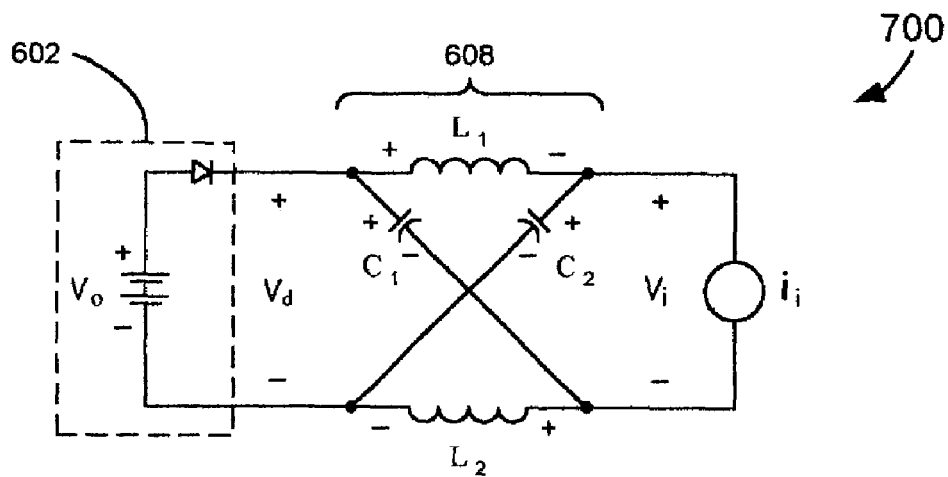
FIG. 7 is an electrical diagram of an equivalent circuit of the Z-converter of FIG. 6, referred to the DC link.
Figure 8:
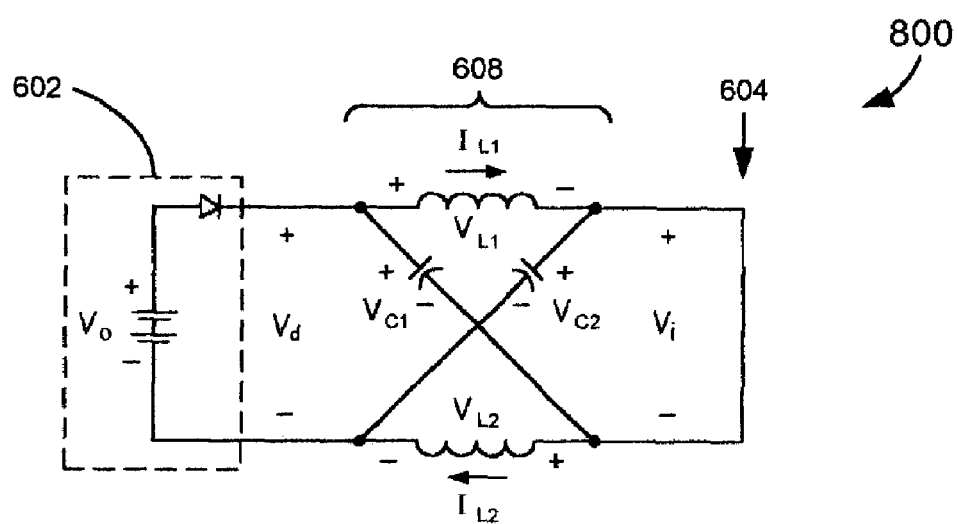
FIG. 8 is an electrical diagram of an equivalent circuit of the Z-converter of FIG. 6, referred to the DC link, when the bridge is in a shoot-through zero state.
Figure 9:
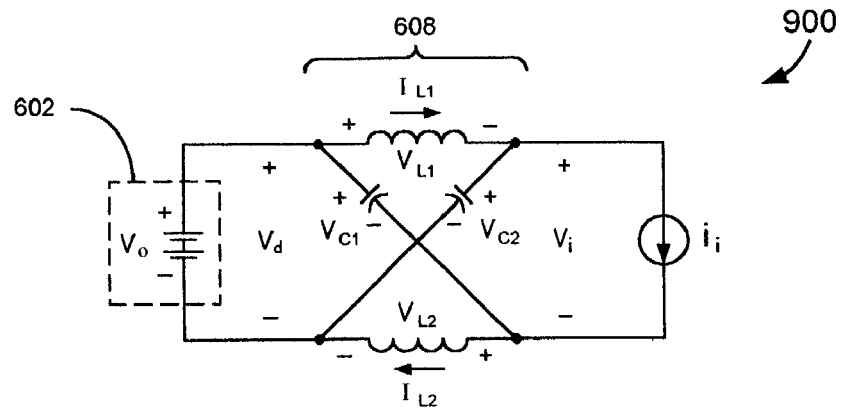
FIG. 9 is an electrical diagram of an equivalent circuit of the Z-converter of FIG. 6, referred to the DC link, when the bridge is in one of eight non-shoot-through states.

FIG. 7 shows an equivalent circuit 700 of the Z-converter 600 with reference to the DC link. As is illustrated in FIG. 8, with reference to the impedance network 608, the bridge 604 is equivalent to a short circuit when the bridge 604 is in a shoot-through zero state. As is shown in FIG. 9, the bridge 604 becomes an equivalent current source when in one of six active states. The bridge 604 can also be represented by current source with a zero value (or an open circuit) when it is one of the two traditional zero states. Thus, FIG. 9 provides an equivalent circuit 900 for the Z-converter 600 of FIG. 6, referenced to the DC link, when the bridge 604 is in one of eight non-shoot-through states (i.e., six active and two zero states).

If the inductors $L_1$ and $L_2$ and capacitors $C_1$ and $C_2$ have the same inductance (L) and capacitance (C), respectively, the Z-source network is symmetrical, and the equations set forth below can be utilized to further explain the operation of the Z-converter 600:

$$V_{C1}=V_{C2}=V_C \text{ and } v_{L1}=v_{L2}=v_L \qquad \text{(Equations 1)}$$

Assuming the bridge 604 is in the shoot-through zero state for a period of $T_0$, during a switching cycle T, the equivalent circuit of FIG. 8 yields the following:

$$v_L=V_c, v_d=2V_c, \text{ and } v_i=0 \qquad \text{(Equations 2)}$$

Assuming the bridge 604 is in a non-shoot-through zero state for a period of $T_1$, during a switching cycle T, the equivalent circuit of FIG. 9 yields the following:

$$v_L = V_0 - V_C,\ v_d = V_0\ \text{and}\ V_i = V_C - v_L = 2V_C - V_0 \quad \text{(Equation 3)}$$

where $V_0$ is the DC source voltage and $T = T_0 + T_1$.

The average voltage of the inductors over one switching period (T) is zero in the steady state and from equations (2) and (3), we have:

$$V_L = \overline{v_L} = (T_0 \cdot V_C + T_1 \cdot (V_0 - V_C))/T = 0 \quad \text{(Equation 4)}$$

or $$\frac{V_C}{V_O} = \frac{T}{T_1 - T_0} \quad \text{(Equation 5)}$$

Similarly, the average DC link voltage across the bridge 604 is found as follows:

$$V_i = \overline{v_i} = (T_0 \cdot 0 + T_1 \cdot (2V_C - V_0))/T = \frac{T}{T_1 - T_0} V_O = V_C \quad \text{(Equation 6)}$$

The peak DC link voltage across the bridge 604 expressed in equations (3) can be rewritten as:

$$\hat{v}_i = V_C - v_L = 2V_C - V_0 = \frac{T}{T_1 - T_0} V_O \quad \text{(Equation 7)}$$

$$\text{with,}\ B = \frac{T}{T_1 - T_0} \geq 1 \quad \text{(Equation 8)}$$

where B is the boost factor provided by the shoot-through zero state. On the other side, the output peak phase voltage from the inverter can be expressed as:

$$\hat{v}_{ac} = M \cdot \frac{\hat{v}_i}{2} \quad \text{(Equation 9)}$$

where M is the modulation index. Using equation (7), equation (9) can be further expressed as:

$$\hat{v}_{ac} = M \cdot B \cdot \frac{V_O}{2} \quad \text{(Equation 10)}$$

Equation 10 illustrates that the output voltage can theoretically be stepped-up and stepped-down by choosing an appropriate buck-boost factor, $B_B$, which is set forth below:

$$B_B = M \cdot B = (0 \sim \infty) \quad \text{(Equation 11)}$$

Thus, the buck-boost factor, $B_B$, is determined by the modulation index and boost factor B, which is determined by controlling the period of the shoot-through zero state.

Figure 10:
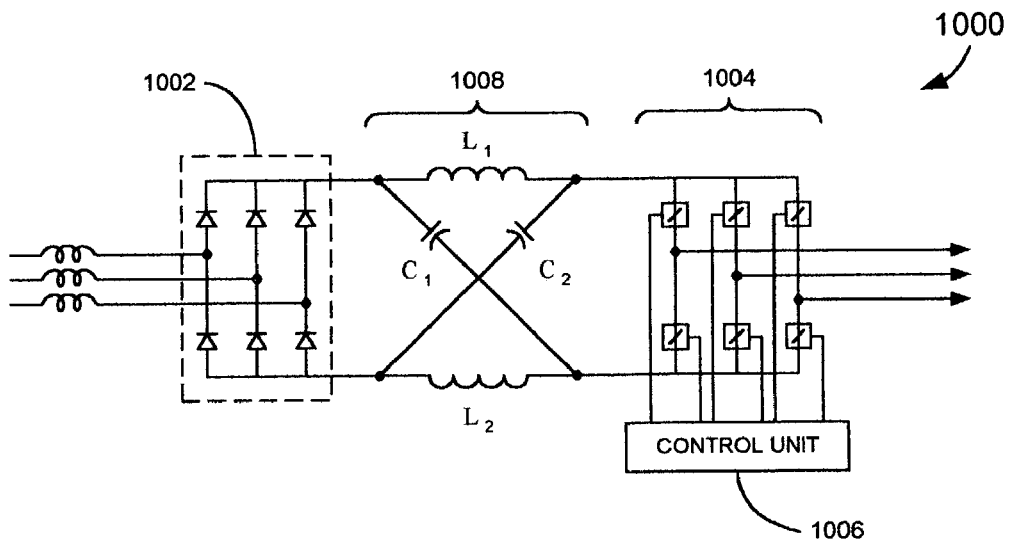
FIG. 10 is an electrical diagram of another Z-converter that functions as an inverter and whose DC current source is provided by a diode rectifier circuit powered by an AC power.
Figure 11:
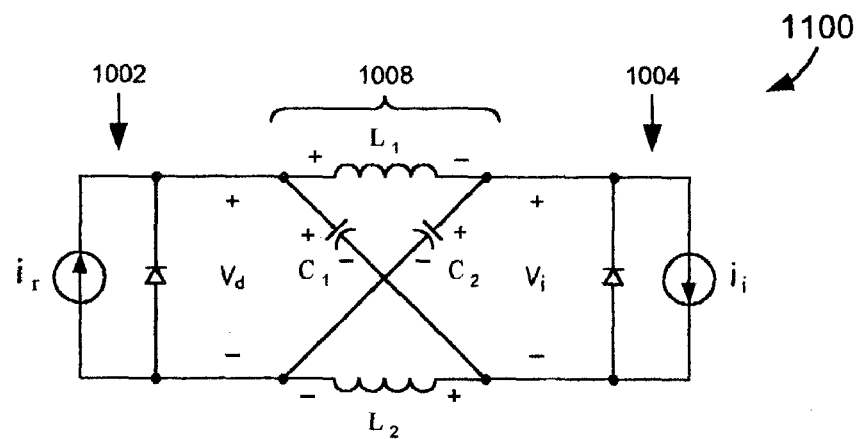
FIG. 11 is an electrical diagram of an equivalent circuit of the Z-converter of FIG. 10, referred to the DC link.

Turning to FIG. 10, an electrical diagram of another Z-converter 1000, which includes a DC current source 1002 provided by a diode rectifier powered by AC power, is depicted. The DC current source 1002 is coupled to a bridge circuit 1004 by an impedance network 1008. FIG. 11 shows an electrical diagram of an equivalent circuit 1100 of the Z-converter 1000 of FIG. 10, referred to the DC link.

Figure 12:
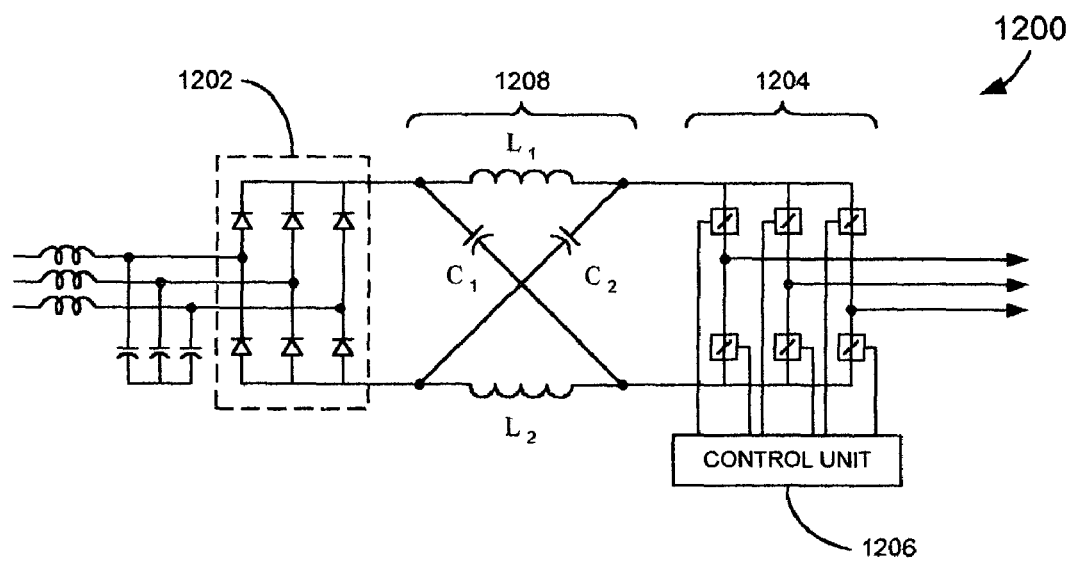
FIG. 12 is an electrical diagram of a Z-converter that functions as an inverter and whose DC voltage source is provided by a diode rectifier circuit powered by an AC power source with an LC filter.
Figure 13:
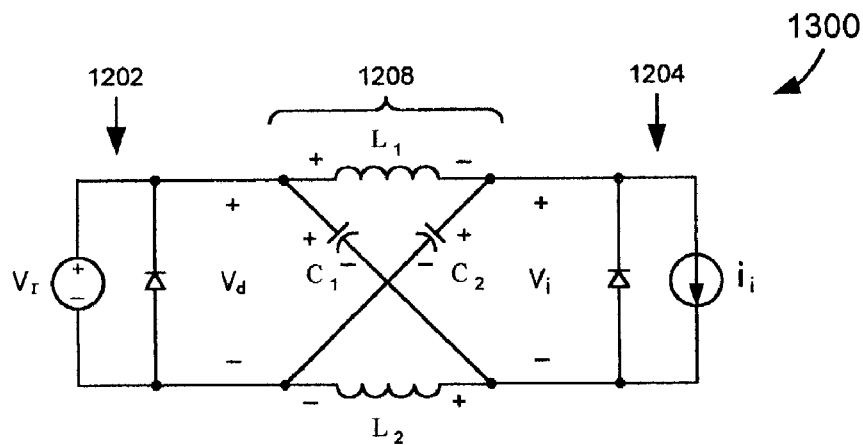
FIG. 13 is an electrical diagram of an equivalent circuit of the Z-converter of FIG. 12, referred to the DC link.

FIG. 12 depicts an electrical diagram of a Z-converter 1200, which includes a DC voltage source 1202 provided by a diode rectifier powered by an AC power source with an LC filter. The DC current source 1202 is coupled to a bridge circuit 1204 by an impedance network 1208. FIG. 13 shows an electrical diagram of an equivalent circuit 1300 of the Z-converter 1200, with reference to the DC link.

Figure 14:
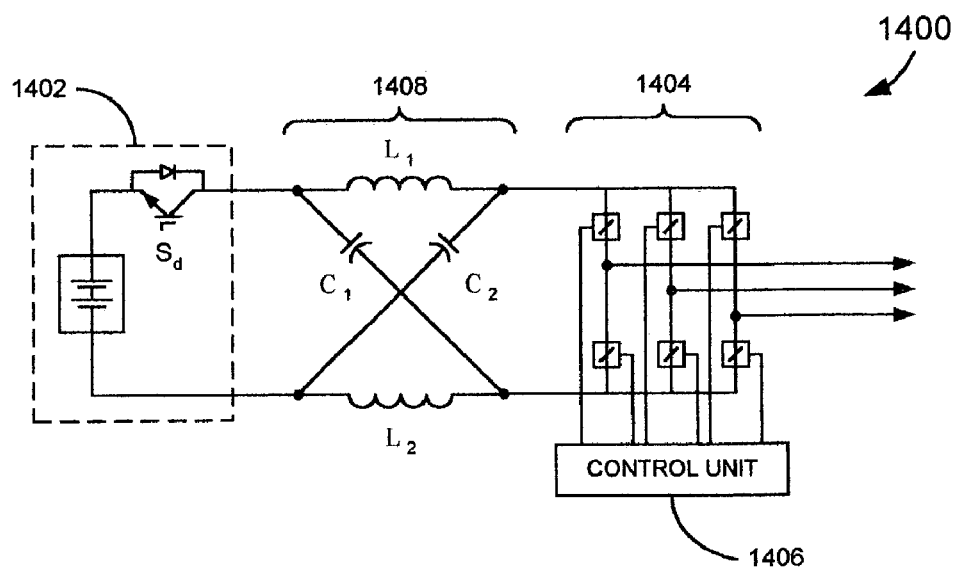
FIG. 14 is an electrical diagram of a Z-converter that functions as an inverter and whose DC voltage source is provided by a battery.
Figure 15:
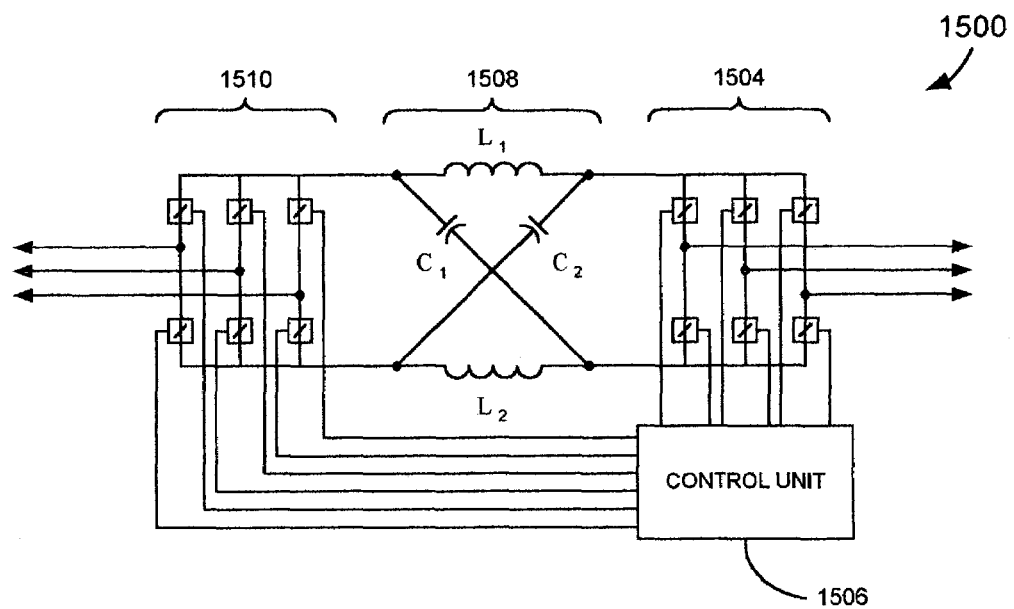
FIG. 15 is an electrical diagram of a Z-converter for AC-AC conversion.
Figure 16:
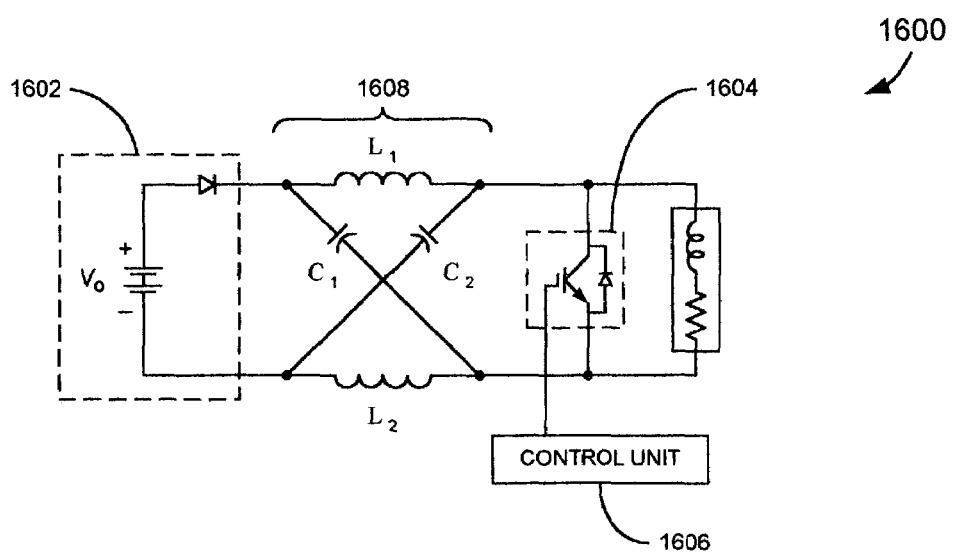
FIG. 16 is an electrical diagram of a Z-converter for DC-DC conversion.

FIG. 14 is an electrical diagram of a Z-converter 1400, which includes a DC voltage source 1402 provided by a battery. The DC voltage source 1402 is coupled to a bridge circuit 1404 by an impedance network 1408. FIG. 15 shows an electrical diagram of a Z-converter 1500 for AC-AC conversion and FIG. 16 is an electrical diagram of a Z-converter 1600 for DC-DC conversion.

Accordingly, an impedance source power converter has been described herein, which includes an impedance network that is configured such that the power converter can perform both buck and boost conversion.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. An impedance source power converter, comprising:
   a power source;
   a main converter circuit coupled to a load; and
   an impedance network coupling the power source to the main converter circuit, wherein the impedance network includes a first inductor having a first end and a second end, a second inductor having a first end and a second end, a first capacitor having a first end and a second end and a second capacitor having a first end and a second end, and wherein the first end of the first inductor is connected to the first end of the first capacitor and the second end of the first inductor is connected to the first end of the second capacitor, where the first end of the second inductor is connected to the second end of the second capacitor and the second end of the second inductor is connected to the second end of the first capacitor, and where the first ends of the first and second inductors provide a first port that is coupled to the power source and the second ends of the first and second inductors provide a second port that is coupled to the main converter circuit.

2. The power converter of claim 1, wherein the converter circuit is a three phase bridge circuit.

3. The power converter of claim 2, wherein the three phase bridge circuit includes six insulated gate bipolar transistors (IGBTs) each with an anti-parallel diode.

4. The power converter of claim 1, wherein the power source is a DC voltage source provided by one of a battery, a fuel cell stack, a diode rectifier circuit and a capacitor.

5. The power converter of claim 1, wherein the power source is a DC current source provided by an inductor fed by one of a battery, a fuel cell stack, a diode rectifier circuit and a thyristor converter.

6. The power converter of claim 1, wherein the load is a DC load and the power source is a DC power source.

7. The power converter of claim 1, wherein the load is an AC load and the power source is a DC power source.

8. The power converter of claim 1, wherein the power source is one of a DC power source and an AC power source.

9. The power converter of claim 1, wherein the power converter performs one of DC/DC, DC/AC, AC/DC or AC/AC conversion.

10. The power converter of claim 1, wherein an amount of voltage buck or boost factor is a function of a time period of a shoot-through zero state and a modulation index or a switching interval duty cycle of the main converter circuit.

11. An impedance source power converter, comprising:
a power source;
a main converter circuit coupled to a load; and
an impedance network coupling the power source to the main converter circuit, wherein the impedance source power converter performs both buck conversion and boost conversion, and wherein an amount of voltage buck or boost factor is a function of a time period of a shoot-through zero state and a modulation index.

12. The power converter of claim 11, wherein the converter circuit is a three phase bridge circuit.

13. The power converter of claim 12, wherein the three phase bridge circuit includes six insulated gate bipolar transistors (IGBTs) each with an anti-parallel diode.

14. The power converter of claim 11, wherein the power source is a DC voltage source provided by one of a battery, a fuel cell stack, a diode rectifier circuit and a capacitor.

15. The power converter of claim 11, wherein the power source is a DC current source provided by an inductor fed by one of a battery, a fuel cell stack, a diode rectifier circuit and a thyristor converter.

16. The power converter of claim 11, wherein the load is a DC load and the power source is a DC power source.

17. The power converter of claim 11, wherein the load is an AC load and the power source is a DC power source.

18. The power converter of claim 11, wherein the power source is one of a DC power source and an AC power source.

19. The power converter of claim 11, wherein the power converter performs one of DC/DC, DC/AC, AC/DC or AC/AC conversion.

20. The power converter of claim 11, wherein the impedance network includes a first inductor having a first end and a second end, a second inductor having a first end and a second end, a first capacitor having a first end and a second end and a second capacitor having a first end and a second end, and wherein the first end of the first inductor is coupled to the first end of the first capacitor and the second end of the first inductor is coupled to the first end of the second capacitor, where the first end of the second inductor is coupled to the second end of the second capacitor and the second end of the second inductor is coupled to the second end of the first capacitor, and where the first ends of the first and second inductors provide a first port that is coupled to the power source and the second ends of the first and second inductors provide a second port that is coupled to the main converter circuit.

21. An impedance source power converter, comprising:
a power source;
a main converter circuit coupled to a load, wherein the converter circuit is a three phase bridge circuit; and
an impedance network having two ports and coupling the power source to the main converter circuit, wherein said impedance network is configured to allow both open circuit and shoot through zero state conditions at the main converter circuit and wherein the impedance source power converter performs both buck conversion and boost conversion, and one of DC/DC, AC/DC or AC/AC conversion.

* * * * *